United States Patent [19]

Vraux

[11] Patent Number: 5,047,904

[45] Date of Patent: Sep. 10, 1991

[54] CAPSULE, IN PARTICULAR FOR MOUNTING THE HEAD OF AN ANGLE-ADJUSTMENT ON A REFLECTOR OF A MOTOR VEHICLE HEADLIGHT

[75] Inventor: Didier Vraux, Noisy-Le-Sec, France

[73] Assignee: Valeo Vision, Bobigny Cedex, France

[21] Appl. No.: 621,045

[22] Filed: Nov. 30, 1990

[30] Foreign Application Priority Data

Dec. 1, 1989 [FR] France .................. 89 15894

[51] Int. Cl.⁵ .............................................. B60Q 1/06
[52] U.S. Cl. ..................... 362/66; 362/273; 362/282; 362/289; 362/324; 362/421
[58] Field of Search ............. 362/61, 66, 269, 271, 362/273, 277, 282, 284, 285, 289, 319, 324, 418, 420, 421, 427, 428

[56] References Cited

U.S. PATENT DOCUMENTS

| | | | |
|---|---|---|---|
| 4,271,456 | 6/1981 | Dick | 362/66 |
| 4,503,486 | 3/1985 | Makita | 362/324 |
| 4,689,725 | 8/1987 | Saijo et al. | 362/66 |
| 4,772,029 | 1/1988 | Ahle et al. | 362/66 |
| 4,843,523 | 6/1989 | Nakamura | 362/273 |
| 4,845,598 | 7/1989 | Watanabe et al. | 362/269 |
| 4,884,174 | 11/1989 | Dorleans | 362/61 |
| 4,894,754 | 1/1990 | Leirlain | 362/66 |
| 4,967,318 | 10/1990 | Evert et al. | 362/427 |

FOREIGN PATENT DOCUMENTS

| | | | |
|---|---|---|---|
| 0313779 | 10/1987 | European Pat. Off. | |
| 3509831 | 3/1986 | Fed. Rep. of Germany | |
| 2624452 | 12/1987 | France | |
| 2609763 | 7/1988 | France | 362/66 |

Primary Examiner—Ira S. Lazarus
Assistant Examiner—Sue Hagarman
Attorney, Agent, or Firm—Blakely, Sokoloff, Taylor & Zafman

[57] ABSTRACT

A capsule, in particular for mounting the head of an angle-adjustment screw on a reflector of a motor vehicle headlight, the capsule being of the type comprising, in the vicinity of a first end, means for receiving the head, and in the vicinity of a second end, fixing means for fixing the capsule to a mount fixed to the reflector. The capsule comprises a first portion including a housing for the head, and a second portion including the fixing means for fixing the capsule to the reflector. Said fixing means comprise flexible means suitable for entering into latching engagement with said mount. Said first portion of the capsule is capable of sliding relative to the second portion to a locking position in which it bears against the flexible means, preventing them from moving out from their latching engagement with the mount.

10 Claims, 2 Drawing Sheets

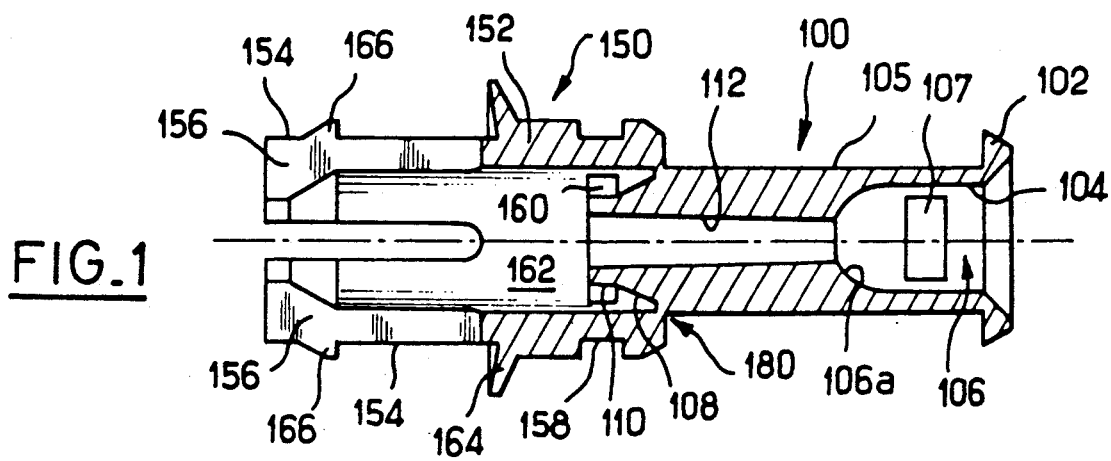
FIG. 1
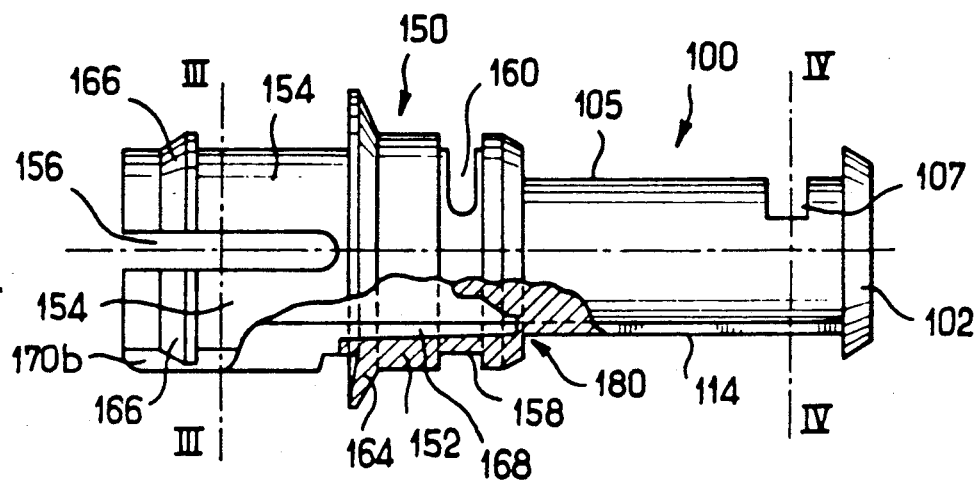
FIG. 2
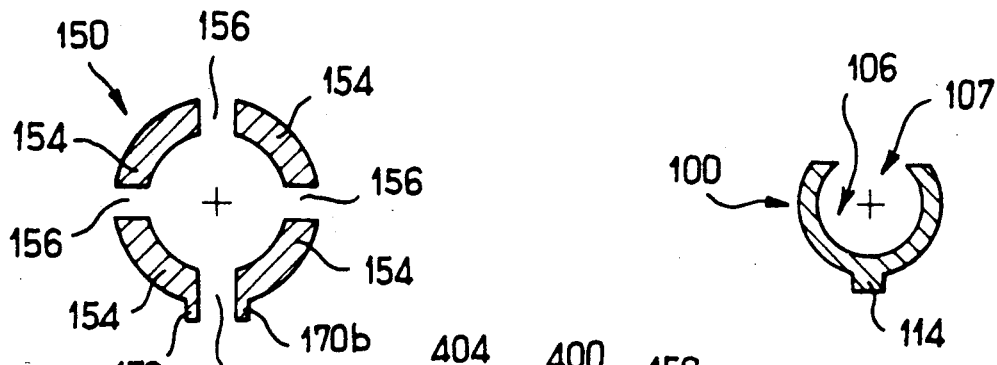
FIG. 3
FIG. 4
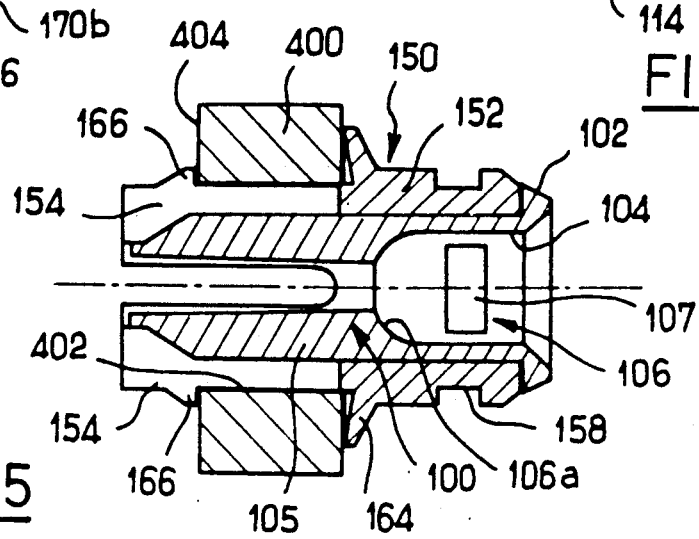
FIG. 5

CAPSULE, IN PARTICULAR FOR MOUNTING THE HEAD OF AN ANGLE-ADJUSTMENT ON A REFLECTOR OF A MOTOR VEHICLE HEADLIGHT

The present invention relates in general terms to mechanically assembling parts, and more particularly it relates to a new assembly means suitable for use between a reflector in a motor vehicle headlight and the head of a screw for adjusting the angle of the reflector.

BACKGROUND OF THE INVENTION

In the prior art, an adjustment screw head is mounted on the headlight by means of a capsule including means for fixing it permanently to the body of the reflector and means for removably receiving the head of the screw. The fixing means conventionally used include gluing, welding, screwing, and the like.

A major drawback of these prior capsules lies in the fact that the above-mentioned fixing means are totally unsuitable for robot assembly of motor vehicle headlights, or the like.

SUMMARY OF THE INVENTION

The present invention seeks to mitigate this drawback of the prior art, and to this end, the present invention provides a capsule, in particular for mounting the head of an angle-adjustment screw on a reflector of a motor vehicle headlight, the capsule being of the type comprising, in the vicinity of a first end, means for receiving the head, and in the vicinity of a second end, fixing means for fixing the capsule to a mount fixed to the reflector, wherein the capsule comprises a first portion including a housing for the head, and a second portion including the fixing means for fixing the capsule to the reflector, wherein said fixing means comprise flexible means suitable for entering into latching engagement with said mount, and wherein said first portion of the capsule is capable of sliding relative to the second portion to a locking position in which it bears against the flexible means, preventing them from moving out from their latching engagement with the mount.

In this way, the capsule can be fixed undismountably in simple manner merely by causing the first portion of the capsule to slide relative to the second.

Preferred, but non-limiting, aspects of the capsule of the invention are mentioned below:

both portions are essentially cylindrical and coaxial;

the two portions are capable of sliding relative to each other from an initial state in which they are interconnected by a thin film of material, in which case they are preferably made simultaneously during a single molding operation;

the flexible means comprise a plurality of flexible tabs each carrying at least one external catch in the vicinity of its free end, and the reflector mount is constituted by a socket including a rear wall against which the catches are capable of engaging; and stop means are provided for preventing one of the two portions of the capsule from moving relative to the other when in the locking position, which means may also constitute means for imprisoning the head in its housing. In which case, the stop means and the imprisoning means are constituted by a clip suitable for being clamped around the two portions of the capsule, penetrating into two windows which are provided in respective ones of said portions and which, in the locking position, overlie each other.

The invention also provides a method of assembling a capsule comprising two portions initially interconnected by a thin film as mentioned above, wherein the method comprises the following steps:

exerting a first thrust on the first position of the capsule to engage the flexible means in the mount and to establish the latching engagement, while the said mount acts as an abutment for the second portion of the capsule; and then exerting a second thrust on the first portion, said second thrust being greater than the first thrust, thereby breaking the thin film and causing said first portion to slide into said locking position.

This method is preferably implemented by robot means.

BRIEF DESCRIPTION OF THE DRAWINGS

An embodiment of the invention is described by way of example with reference to the accompanying drawings, in which:

FIG. 1 is an axial section view through a capsule made in accordance with the invention and shown in its initial state;

FIG. 2 is an axial section view through the FIG. 1 capsule on a plane perpendicular to the plane of FIG. 1;

FIG. 3 is a cross-section on line III—III of FIG. 2;

FIG. 4 is a cross-section on line IV—IV of FIG. 2;

FIG 5 is an axial section view showing the capsule of FIGS. 1 and 2 in a final state;

DETAILED DESCRIPTION

Figure 6:
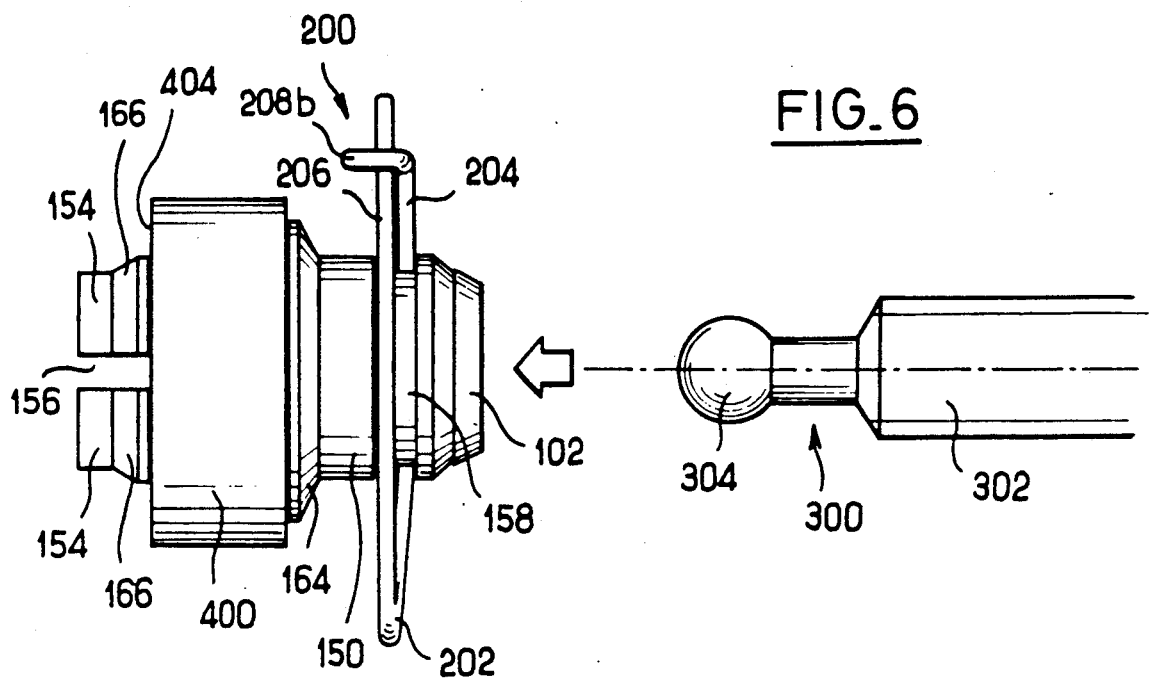
FIG. 6 is an elevation view of the capsule in the final state of FIG. 5, and also showing an adjustment screw for a reflector and a retaining clip.

With reference initially to FIGS. 1 to 4, there follows a description of a capsule constituting an intermediate fixing component between a headlight reflector and the head of an angle-adjustment screw for said reflector.

Such a capsule is to be fixed in permanent and reliable manner onto the reflector and it must be capable of receiving the head in removable manner.

The capsule is generally in the form of a body of revolution about an axis A, and comprises a first portion or body portion 100 in which the head is to be received, and a second portion or base 150 for fixing the capsule into the reflector.

The body 100 is generally cylindrical in shape and comprises a flange 102 at a first end, which flange surrounds an opening 104 whereby the head is inserted into a housing 106. The housing is cylindrical in shape and is terminated by a bottom 106a which is substantially hemispherical in the present example and against which the head is to bear. A window 107 formed through the wall of the body 100 about halfway along the housing 106 serves, as described below, to implement the means which serve in particular to retain the head in its housing.

The body 100 includes a cylindrical central portion 105 and at its end furthest from the housing 106 it is terminated by a tapering portion 108 followed by a short cylindrical portion of smaller diameter.

In addition, an essentially cylindrical passage 112 extends between the bottom of the housing 106 and the opposite end of the body 100, thereby saving material.

It may also be observed in FIG. 2 that the body 100 includes a longitudinal external key 114 for purposes that are explained below.

The base 150 is generally in the form of a tube having a generally cylindrical hollow portion 152 with a plurality of flexible tabs 154 (four in this case) extending therefrom away from the body 100, which tabs are constituted, in practice, by, extending the portion 152 while leaving four longitudinal notches 156 therein, which notches may be mutually spaced apart at 90° intervals around the axis A, as can be seen in FIG. 3.

The portion 152 includes an outer annular groove 158 at a well determined axial position therealong, and a window 160 passes through the wall of the portion 152 between the bottom of this groove and a central passage 162.

A shoulder 164 is provided at the end of the portion 152 situated at the transition to the flexible tabs 154. Each tab 154 includes a catch 166 of essentially triangular cross-section on its outside face in the vicinity of its free end.

The central passage 162 through the portion 152 has a diameter which is equal to or slightly greater than the outside diameter of the main central portion of the body 100, and while they are at rest, the four tabs 154 circumscribe a cylinder whose diameter is essentially equal to or slightly greater than the outside diameter of the central portion of the body 100.

Towards their ends, the inside faces of the tabs 154 are provided with inwardly projecting frustoconical portions 157 and portions 159 defining a smaller inside diameter, said portions being essentially complementary in shape to portions 108 and 110 of the body 100.

In addition, the passage 162 defines a slot 168 for receiving the key 114, said slot extending in line with one of the notches 156 between two adjacent flexible tabs 154.

Finally, a key 170 is defined by two ribs 170a and 170b formed in the adjacent edge regions of two adjacent flexible tabs 154 on either side of the notch 156 between said tabs.

According to a preferred aspect of the invention, the portions 100 and 150 of the capsule of the invention are initially interconnected as shown in FIGS. 1 and 2 by a continuous thin film of material referenced 180 connecting the edge situated at the intersection of the wall of the inside passage 162 and the end face of the portion 150 furthest from the flexible tabs to the edge situated at the transition between the outside wall of the main cylindrical portion and of the tapering portion 108 of the body 100.

Thus, and most advantageously, the two portions of the capsule can be made simultaneously in a single molding operation using a plastic material.

Figure 7:
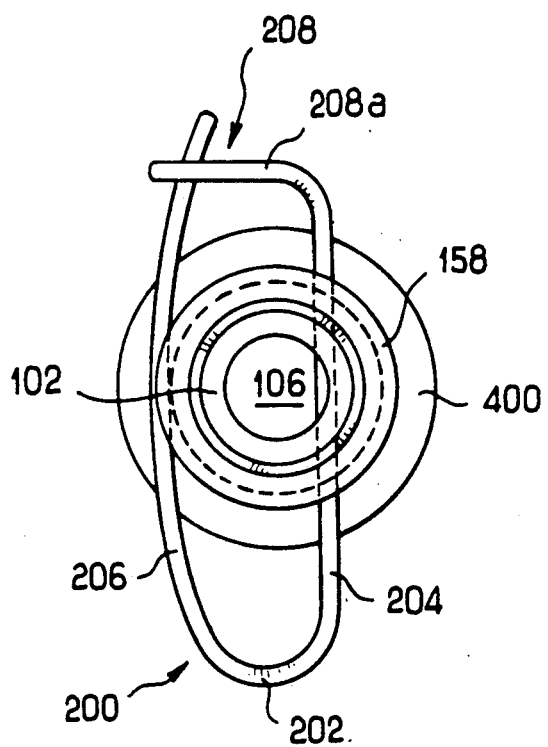
FIG. 7 is an end view of the capsule and of the clip shown in FIG. 6.

With reference now to FIGS. 6 and 7, there can be seen a clip 200 which is generally U-shaped, it has an end portion 202 bent through about 180°, a first branch 204 and a second branch 206 which are essentially parallel, and a locking branch 208 comprising a transverse portion 208a which extends from the branch 204 and which lies substantially in the same plane as the portions 202, 204, and 206, together with a latching portion 208b extending essentially perpendicularly from the portion 208a. The end region of the second branch 206 can thus latch behind the portion 208b as shown in FIGS. 6 and 7. The clip is preferably made of a relatively resilient steel.

FIG. 6 also shows a portion of an ajustment screw 300 for varying the angle of a reflector (not shown) in a motor vehicle headlight. The screw comprises a threaded rod 302 with a head 304 at one end thereof. In this case, the head 304 is generally spherical in shape, however it would also be possible to use some other shape, e.g. a conical head. By rotating the screw 300 in a complementary tapped portion (not shown) using drive means (not shown), it is possible to displace the head 304 in the longitudinal direction of the screw in conventional manner. If the head is fixed to a given point on a reflector (and the reflector is provided with means enabling it to pivot), then the angle of the reflector is varied.

Finally, FIGS. 5 to 7 show a socket 400 which is fixed to the rear wall of a reflector (not shown), and integrally molded therewith, for example. This socket has a cylindrical inside passage 402 and, at its rear end (to the left in FIGS. 5 and 6), it has a catching surface 404 at right angles. A slot (not shown) is also formed in the cylindrical passage 402 for receiving the key constituted by the ribs 170a and 170b.

The description below describes the steps performed when fixing the head 304 to the rear of a reflector, and more precisely to the socket 400 by means of a capsule of the invention.

To begin with, the capsule in its initial state as shown in FIGS. 1 and 2 is brought up to the passage 402 through the socket 400 with the flexible tabs 154 pointing to the opening.

Then, by applying appropriate thrust, the tabs 154 are inserted in the passage 402, thereby deforming the tabs inwardly until their catches 166 reach the rear wall 404 of the socket and catch onto it by the resilient return effect.

Thereafter, by exerting greater thrust on the body 100, and preferably by imparting a shock thereto with the portion 150 bearing against the socket 400, the thin film of material 180 interconnecting the portions 100 and 150 of the capsule is broken. Under the effect of the shock, the film breaks and the body 100 is free to slide (from right to left in FIGS. 1 and 2) into the fixing portion. (Naturally the thickness of the film 180 is selected so that rupture takes place when a reasonable shock is applied, but does not take place during the initial stage described above while the base 150 is being inserted in the socket 400.)

During this motion, the entire body 100 apart from its flange 102 substantially occupies the space defined above by the inside passage 162 in the portion 150, and in particular the portion of the body situated furthest from the flange 102 bears relatively closely against the inside faces of the tabs 154, with the portions 108 and 110 of the body also bearing against complementary shapes 157 and 159 provided on said inside faces.

This final state of the capsule is shown in FIGS. 5 and 6. It will readily be understood that in this state the body 100 prevents the flexible tabs 154 from moving inwards, and as a result the catches 166 can no longer release the socket 400. The capsule is thus permanently installed with a very high degree of reliability.

In addition, this non-dismountable fixing may be performed merely by exerting two successive thrusts on the body 100, the first thrust engaging the flexible tabs inside the socket and the other breaking the thin film, which operationsf are easily performed by a robot for robot assembly of headlights or the like.

In addition, the windows 107 and 160 formed respectively through the portions 100 and 150 of the capsule are positioned in such a manner that, when the capsule is in this final state, these windows are individually superposed. This superposition is also ensured by the key 114 and the corresponding slot 168 which prevent the body 100 rotating relative to the base 150.

Thus, as can be seen FIGS. 6 and 7, when the clip is installed in the groove 158 of the base, and the clip is locked so that its two branches 204 and 206 exert pressure inwards, then the branch 204 (it could equally well be the branch 206) penetrates into the two windows 107 and 160 and engages, as can clearly be seen in FIG. 7, a small way into the inside space 106 in which the head is received.

A first function of this engagement of the branch 204 in the two superposed windows is to lock the two portions 100 and 150 of the capsule together, thereby preventing the body 100 from sliding out from the base 150 which would then make it possible to disengage the tabs 154 from their locking engagement with the socket 400.

The second function of the clip is to lock the head 304 in the associated housing 106 in the body 100, with the head bearing against the bottom 106a.

In a first procedure, the clip 200 may initially be put into place, after which the head 304 may be inserted into its housing by displacement along arrow F in FIG. 6. In this case, the branch 204 moves resiliently out of the way to allow the head 304 to pass, after which it returns resiliently to the position shown in FIG. 7, thereby locking the head in its housing.

In a second procedure, the head 304 is initially installed, after which the clip acts simultaneously to lock the two portions of the capsule together and to imprison the head.

Naturally, the invention is not limited in any way to the embodiment described above and shown in the drawings, and the person skilled in the art may add any variant or modification that comes within the scope of the invention. In particular, the means for holding the portions 100 and 150 of the capsule in their initial state prior to being installed on the socket may be omitted, or else they may be different from the film of material 180 described above. In the first case, the two portions 100 and 150 may initially be two separate parts, with the base 150 being installed initially in the socket and with the body subsequently being inserted into the base. In the second case, the continuous film of material 180 may be replaced by a plurality of discrete bridges, of suitable number and section. In a variant, it would also be possible to use a snap-fastening or force-fit engagement between the two portions, with such engagements being designed to allow the two portions to slide relative to each other only under the action of a force which is substantially greater than the force required for installing the base 150 in the socket 400. In this case, the engagement can be broken by permanent and/or resilient deformation of the material from which they are made.

Furthermore, it is possible to envisage preventing the two portions from sliding relative to each other by means other than the two superposed windows and the clip engaged therein as described above. For example, at the end of the stroke of the body 100 into base 150, provision may be made for establishing a snap-fastening type connection or a force-fit type engagement between the two portions.

Finally, the invention is advantageously applicable whenever permanent or semipermanent fixing is desired without using conventional fixing means such as those described in the introduction.

I claim:

1. A capsule, in particular for mounting the head of an angle-adjustment screw on a reflector of a motor vehicle headlight, the capsule being of the type comprising, in the vicinity of a first end, means for receiving the head, and in the vicinity of a second end, fixing means for fixing the capsule to a mount fixed to the reflector, wherein the capsule comprises a first portion including a housing for the head, and a second portion including the fixing means for fixing the capsule to the reflector, wherein said fixing means comprise flexible means suitable for entering into latching engagement with said mount, and wherein said first portion of the capsule is capable of sliding relative to the second portion to a locking position in which it bears against the flexible means, preventing them from moving out from their latching engagement with the mount.

2. A capsule according to claim 1, wherein both portions are essentially cylindrical and coaxial.

3. A capsule according to claim 2, wherein the two portions are capable of sliding relative to each other from an initial state in which they are interconnected by a thin film of material.

4. A capsule according to claim 3, wherein both portions are made simultaneously during the same molding operations.

5. A capsule according to claim 2, wherein the flexible means comprise a plurality of flexible tabs each carrying at least one external catch in the vicinity of its free end, and wherein the reflector mount is constituted by a socket including a rear wall against which the catches are capable of engaging.

6. A capsule according to claim 1, provided with stop means for preventing one of the two portions of the capsule from moving relative to the other when in the locking position.

7. A capsule according to claim 6, wherein the stop means also include imprisoning means for imprisoning the head in its housing.

8. A capsule according to claim 7, wherein the stop means and the imprisoning means are constituted by a clip suitable for being clamped around the two portions of the capsule, penetrating into two windows which are provided in respective ones of said portions and which, in the locking position, overlie each other.

9. A method of assembling a capsule according to claim 3, wherein the method comprises the following stages:
   exerting a first thrust on the first portion of the capsule to engage the flexible means in the mount and to establish the latching engagement, while the said mount acts as an abutment for the second portion of the capsule; and then
   exerting a second thrust on the first portion, said second thrust being greater than the first thrust, thereby breaking the thin film and causing said first portion to slide into said locking position.

10. A method according to claim 9, wherein the method is performed by robot means.

* * * * *

UNITED STATES PATENT AND TRADEMARK OFFICE
CERTIFICATE OF CORRECTION

PATENT NO. : 5,047,904
DATED : 09/10/91
INVENTOR(S) : Vraux

It is certified that error appears in the above-identified patent and that said Letters Patent is hereby corrected as shown below:

| | | | | |
|---|---|---|---|---|
| col. 04, line 01 | delete | "ajustment" | insert | --adjustment-- |
| col. 04, line 66 | delete | "operationsf" | insert | --operations-- |
| col. 05, line 08 | after | "seen" | insert | --in-- |

Signed and Sealed this

Ninth Day of November, 1993

*Attest:*

BRUCE LEHMAN

*Attesting Officer*      *Commissioner of Patents and Trademarks*